P. W. SHARP.
GRAIN SHOCKER.
APPLICATION FILED OCT. 1, 1908. RENEWED JULY 23, 1912.
1,038,449.
Patented Sept. 10, 1912.
4 SHEETS—SHEET 2.
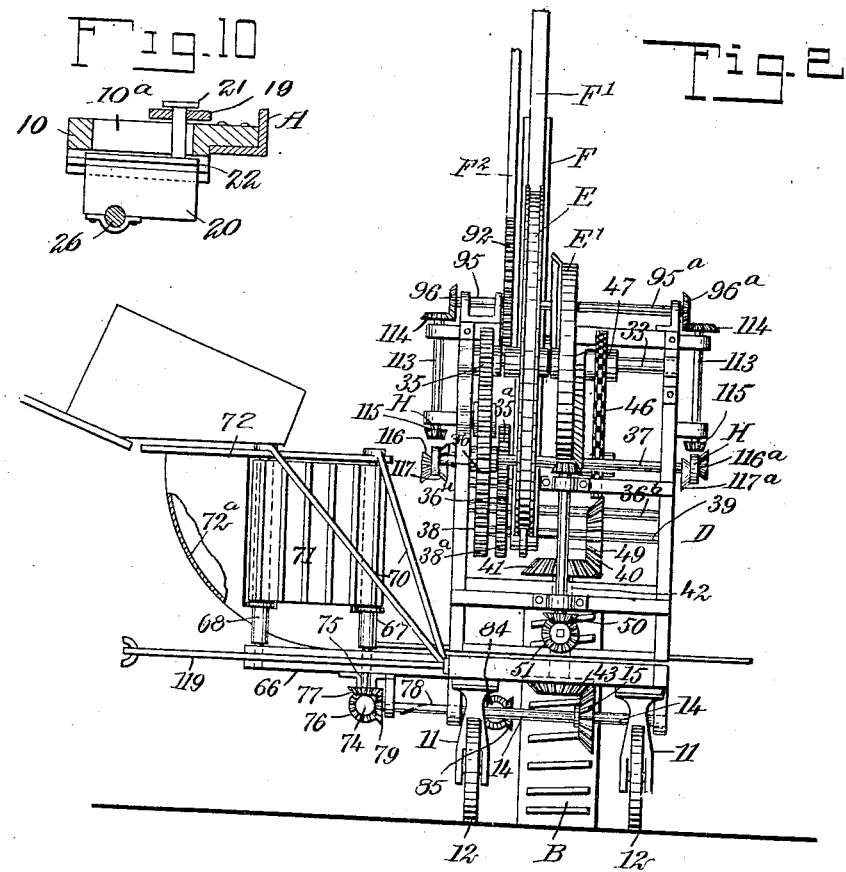
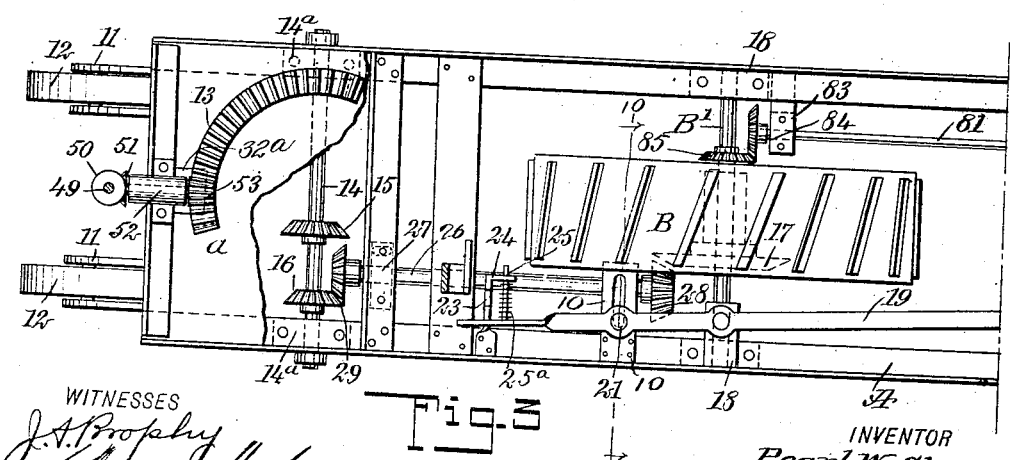
WITNESSES
J. A. Brophy
INVENTOR
Pearl W. Sharp
BY Munn & Co.
ATTORNEYS P. W. SHARP.
GRAIN SHOCKER.
APPLICATION FILED OCT. 1, 1908. RENEWED JULY 23, 1912.
1,038,449.
Patented Sept. 10, 1912.
4 SHEETS—SHEET 3.
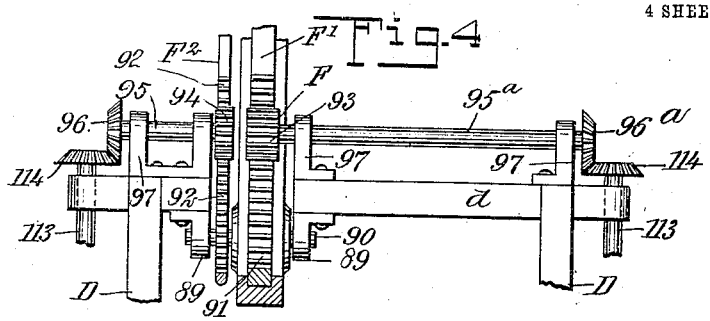
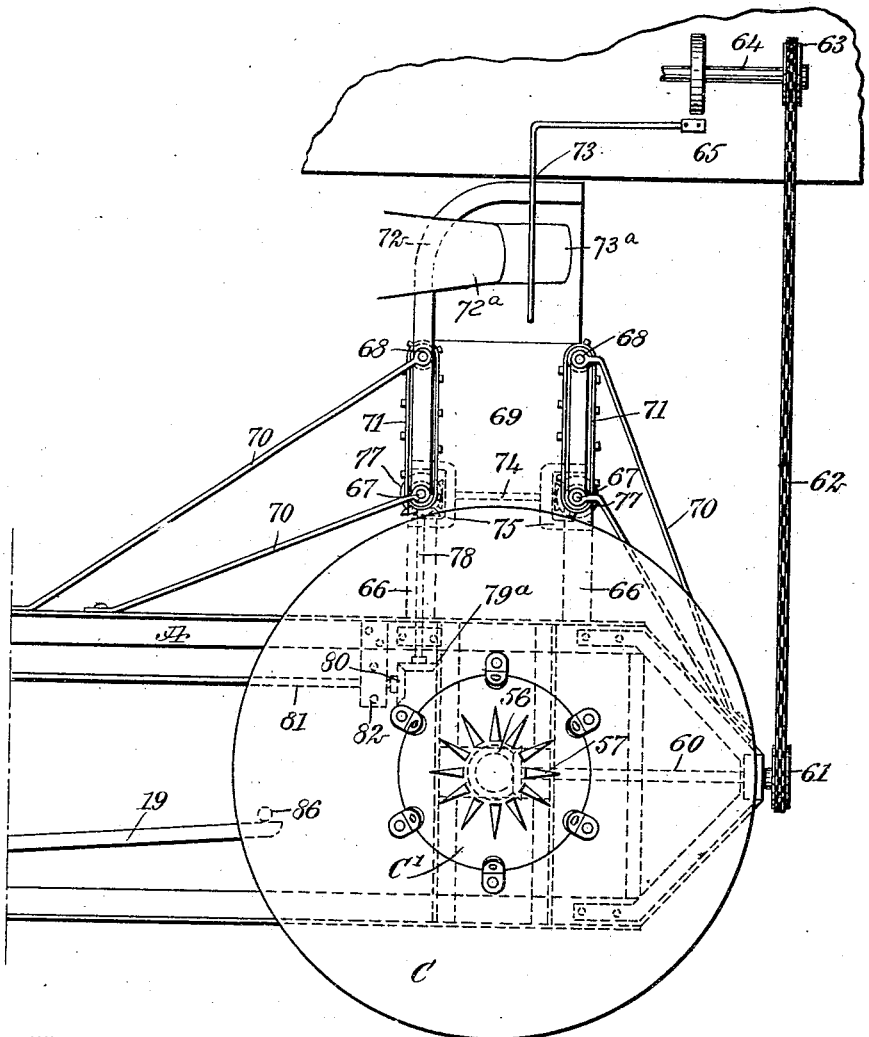
WITNESSES
INVENTOR
Pearl W. Sharp
BY
ATTORNEYS P. W. SHARP.
GRAIN SHOCKER.
APPLICATION FILED OCT. 1, 1908. RENEWED JULY 23, 1912.
1,038,449.
Patented Sept. 10, 1912.
4 SHEETS—SHEET 4.
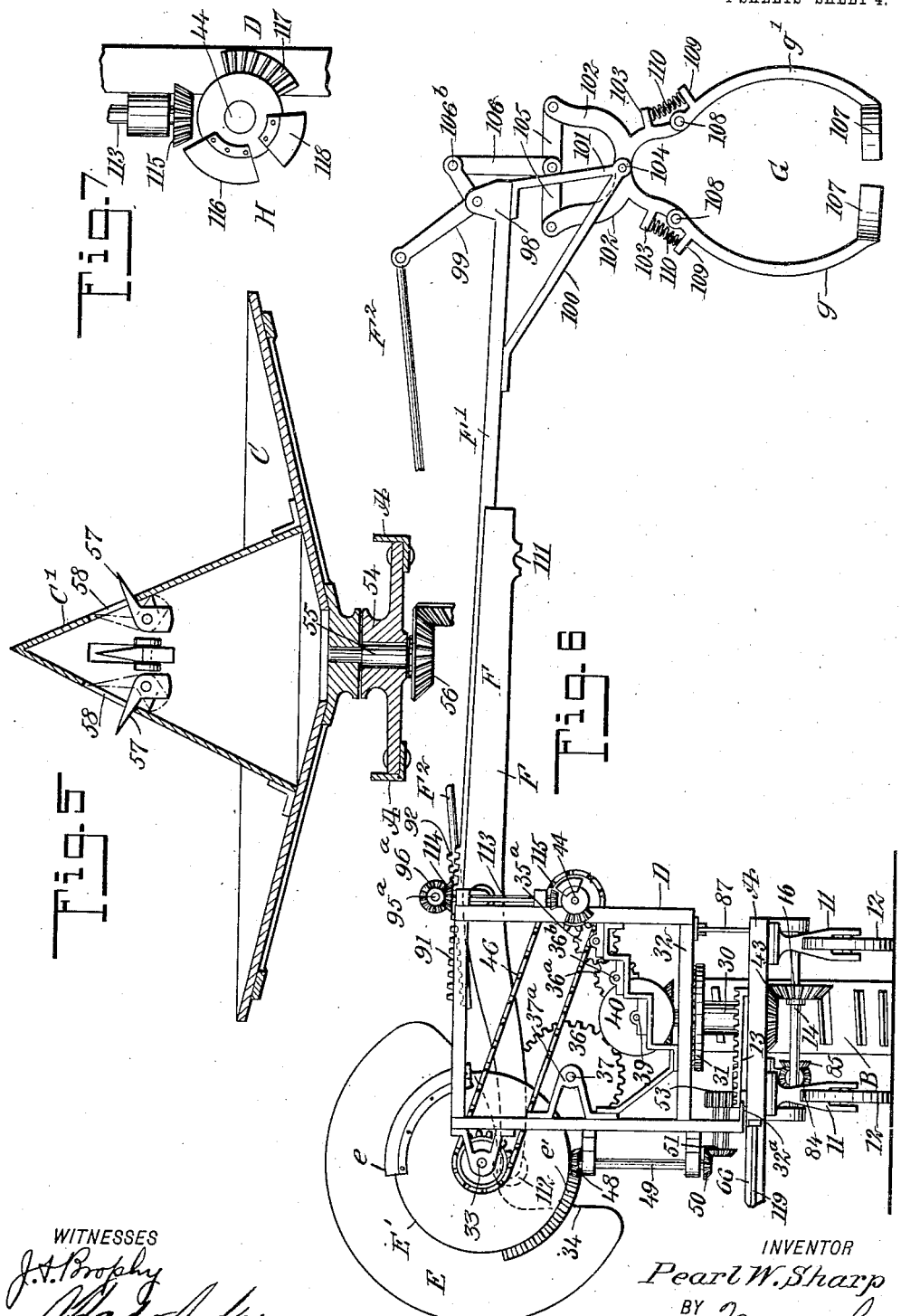
WITNESSES
J. A. Brophy
Fred Acker
INVENTOR
Pearl W. Sharp
BY Munn & Co.
ATTORNEYS

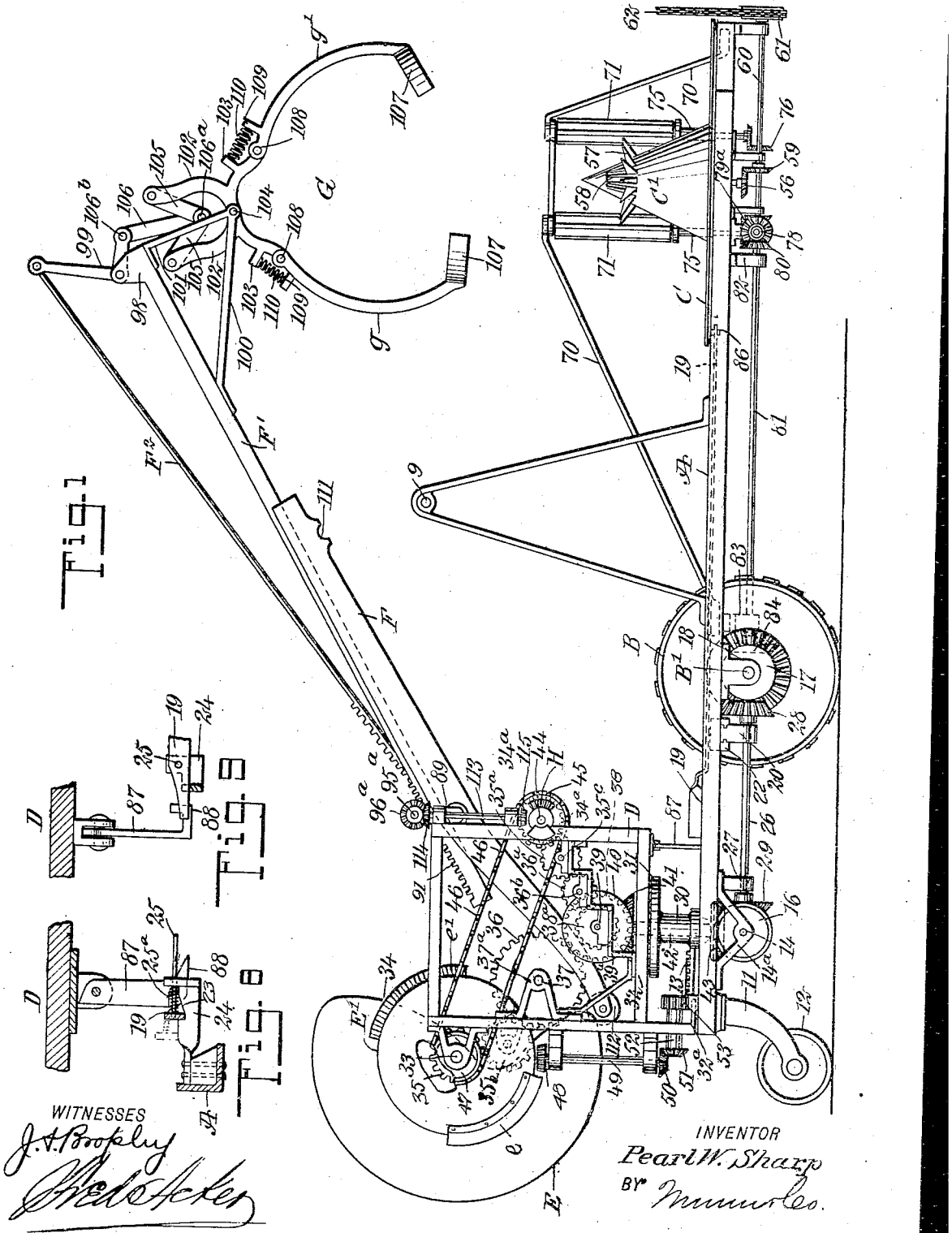

UNITED STATES PATENT OFFICE.

PEARL WILSON SHARP, OF BOWBELLS, NORTH DAKOTA.

GRAIN-SHOCKER.

1,038,449. Specification of Letters Patent. Patented Sept. 10, 1912.

Application filed October 1, 1908, Serial No. 455,621. Renewed July 23, 1912. Serial No. 711,191.

*To all whom it may concern:*

Be it known that I, PEARL WILSON SHARP, a citizen of the United States, and a resident of Bowbells, in the county of Ward and State of North Dakota, have invented a new and Improved Grain-Shocker, of which the following is a full, clear, and exact description.

The purpose of the invention is to provide a grain shocker adapted for attachment to any grain binder and so constructed that the bundled grain is delivered from the binder platform to a receiving disk wherein the bundles are grouped and held in predetermined arrangement around a conical support, until a suitable quantity of bundles have been thus assembled, after which the operative mechanism of the shocker is automatically set in motion and a shock conveyer automatically grasps the assembled bundles and sets them on the ground in the form of a shock.

It is a further purpose of the invention to provide simple and reliable means for automatically controlling and timing the shock conveyer in such manner as to first bring the conveyer, while in its open position, down over the assembled bundles, next to close upon the bundles and lift them as a unitary mass from their supports, and then to carry the shock thus formed to one side of the attachment, deliver the shock in standing position upon the ground, and release the shock; the conveyer being finally restored to its first position ready for another operation.

It is also a purpose of the invention to accomplish the above-mentioned results while the machine is being moved bodily along through a field.

The invention consists in the novel construction and combination of the several parts as will be hereinafter particularly described in the drawings, in which similar characters of reference designate corresponding parts in all the views.

Figure 1 is a side elevation of the machine complete; Fig. 2 is a rear elevation of the same; Fig. 3 is a plan view of the rear portion of the shocker; Fig. 3ª is a fragmentary plan view of the revoluble bundle receiver and parts immediately associated with it. Fig. 4 is a sectional view of that portion of the shocker which directly operates the conveyer and locking arms for the shock conveyer; Fig. 5 is an enlarged vertical section through the platform upon which the bundles are placed, and the conical support for the bundles carried thereby; Fig. 6 is a rear elevation of the base of the shocker and a side elevation of the shock carriage, shock conveyer and connecting parts carried to one side, the shock conveyer being closed, but otherwise occupying the position it assumes in order to deliver the shock; Fig. 7 is a detail view of one of the cam gears that operate the shaft used for operating the conveyer and locking arms; Figs. 8 and 9 are sectional detail views of the trip device for the power shifting mechanism and show a portion of said mechanism; and Fig. 10 is a section on the line 10—10 of Fig. 3, looking in the direction of the arrow.

A represents the bed of the attachment upon which a rest 9 is erected at or near the center, and this bed is supported between its ends by aid of a driving wheel B, located about centrally between its sides and rolling upon the ground. The bed is further supported by caster wheels 12, journaled in suitable bearings 11. At the rear of the bed A (see Fig. 3) a floor $a$ is constructed so as to serve as a platform, and mounted upon this platform adjacent to its left-hand side is a segmental rack 13. A revoluble shaft 14 is journaled in suitable bearings 14ª, carried by the bed A, these bearings being located beneath the platform $a$. Upon said shaft two bevel gears 15 and 16 are secured. The driving wheel B is secured upon an axle B′ mounted in suitable bearings 18, and disposed slightly inside of the rim of the said wheel B a bevel gear 17 is secured to the axle, as shown in Fig. 3. A shifting lever 19 is pivoted upon the right-hand bearing 18 and movable horizontally. This lever is adapted at certain times to control a transmission of power from the axle B′ to the drive shaft 14. This shifting lever, adjacent to its rear end is connected by a pin 21 with a box 20, the latter being mounted to slide in bearings 22, as is shown in Figs. 1, 3 and 10. The bearings 22 are secured upon the under side of a bracket 10, the latter being mounted rigidly upon the bed A. The bracket 10 is provided with a slot 10ᵃ through which the pin 21 extends. The rear end of the said shifting lever 19 is flattened and is slidably supported upon a bracket 24 and arranged to enter a slot or recess 23 therein, as is shown in Figs. 3, 8 and 9.

A pin 25 is attached to the rear end of the lever 19 and is encircled by a spring 25ᵃ which presses against the bracket 24. The pin 25 extends through the bracket 24, and is slidable relatively to the same. The shifting lever 19 is made of spring steel and is pivoted on the right hand bearing 18. The spring 25 acts to restore the lever 19 to its normal position as soon as the rear end of this lever is raised out of the recess 23 in the bracket 24, by the action of a hinged trip arm 87 hereinafter more fully described. A revoluble shaft 26 extending in the general direction of the length of the bed, is adapted to communicate motion from the revoluble axle B′ to the shaft 14. The shaft 26 is journaled in the sliding box 20, and in a rear fixed box 27, having slight lateral movement therein, as is indicated in Fig. 3. A bevel pinion 28 is secured upon the forward end of the shaft 26 and is adapted to mesh with the gear 17 on the axle B′, but is normally held out of mesh by the aforesaid shifting lever 19.

At the rear end of the said driven shaft 26 a second bevel pinion 29 is secured, and the latter is at all times in mesh with the bevel gear 16 on the drive shaft 14, as is shown in Fig. 3. The shifting lever 19 is actuated by the revolution of a combined shock receiver and stacker, comprising a tray C and a cone C′. This combined shock receiver and stacker is so constructed and arranged that after it has received a suitable number of bundles it will, in a manner to be hereinafter described, cause the axle B′ and the drive shaft 14 to be coupled together for such a length of time as will permit the shocker to remove and deposit the collected bundles and return to its normal position.

A tubular post 30 (see Fig. 1, left hand portion) is erected upon the table at a point from which the radius of the segment rack 13 is struck, and is provided at its upper end with a ball bearing table 31. Upon this table a carriage D is mounted to revolve, its bottom portion 32 resting upon said balls or rollers. The travel of the carriage D is limited by a foot 32ᵃ at its lower rear portion, this foot 32ᵃ extending underneath the rack 13, as indicated in Fig. 6, and serving to brace the revolving carriage as well as to serve as a limiting stop for preventing excessive turning movement of said carriage.

The carriage D may be of any suitable construction, but is usually rectangular and of skeleton formation, as illustrated. A shaft 33 is journaled in suitable bearings upon the upper rear portion of the carriage D, as is shown in Figs. 1, 2 and 6. This shaft I term a cam shaft. It carries a large cam E for raising and lowering the conveyer of the shocker, and a gear E′ adapted to bring about the rotary movement of the carriage D. The large cam E is secured rigidly to the shaft 33 and is practically segmental in general contour, its curved periphery being concentric with its center, but in one edge, normally the forward edge, which would be otherwise a straight edge, a recess 34 is produced, the wall of this recess coming generally to a point at one side of the center of the cam, as is shown in Fig. 1. A gear wheel 35 is secured upon the cam shaft 33, forming one of a chain of gears including the gears 35ᵇ 36 and 38, shown in Figs. 1 and 6. The gear 36 is mounted upon a shaft 37, the latter being supported by hangers 37ᵃ which extend forwardly from the rear portion of the revolving carriage. The gear 38 is carried by a shaft 39 which is mounted upon the lower portion of stepped bearings 39ᵃ, shown in Figs. 1 and 6, and is located at or near the central portion of the said carriage. The shaft 39 carries a bevel gear 40 secured to it, this gear meshing with a bevel gear 41, carried by a short vertical shaft 42. This shaft 42 extends loosely down through the tubular post 30, and is provided at its lower end with a bevel gear 43, that meshes with the bevel gear 15 on the drive shaft, so as to impart a rotary movement to the cam shaft 33. A shaft 44 is journaled in suitable bearings at the forward portion of the carriage D, about midway between its top and bottom, as is shown in Figs. 1 and 6, and on this shaft a sprocket wheel 45 is secured. The sprocket wheel 45 is connected by a chain belt 46 with a sprocket wheel 47, this sprocket wheel forming a portion of the hub of the gear E′, as is shown in Figs. 1 and 2. The shaft 44 carries at each end gears hereinafter described. These gears have direct operative connection with the shock conveyer, also hereinafter described. The shaft 44 is driven from the shaft 39 by a train of gearing shown in Figs. 1, 2 and 6. This train of gearing consists of a gear 38ᵃ upon the shaft 39 (see Fig. 2) a meshing gear 36ᵃ upon a shaft 36ᵇ, a gear 35ᵃ upon a shaft 35ᶜ, and a gear 34ᵃ upon the shaft 44, all of the auxiliary shafts being mounted upon the stepped bearings 39ᵃ.

The gear E′ is loosely mounted upon the shaft 33 and is provided with toothed segments e and e′, diametrically opposite each other, the said segments being at opposite sides of the gear E′, as shown in Fig. 1.

This gear E′ is adapted for turning the carriage D so as to alternately bring the shock conveyer from a position to receive a shock to a position to deliver the same and return it to normal position. This is accomplished as follows: A shaft 49 is vertically journaled at the rear of the carriage D, as shown in Figs. 1, 3 and 6. This shaft carries a bevel pinion 48 at its upper end, to be engaged by the segments e and e′, and a second bevel pinion 50 at its lower end. The lower pinion 50 engages with a corresponding beveled pinion 51 at the rear end of a short horizontal shaft 52, mounted in suitable bearings upon the carriage D, and this shaft 52 is provided with a plain pinion 53, that engages the teeth of the rack 13. In the operation of this portion of the device, the toothed segment e′ acting on the shaft 49, swings the support for the bundle carrier (to be hereinafter described) by the movement of the carriage D, at right angles to the body of the device to deposit a shock on the ground, as is shown in Fig. 6. The segment e now reverses the movement of the carriage D, returning the support for the shock conveyer to its normal position shown in Fig. 1.

The bundle receiver C, shown in Fig. 5, and located at the forward portion of the device, as shown in Fig. 1, is in the form of a dished disk and turns upon a cross bar 54. This cross bar is secured to the frame A, and is attached to a pivot pin 55, that turns in said cross bar and is provided with a bevel gear 56 at its lower end. The bundles when placed upon the tray C rest against the cone C′ and are held in position by pivoted, weighted prongs 57 having their pivots within the cone and their points extending out through openings 58.

The stacker and bundle receivers are usually driven in the following manner: A gear 59 is made to mesh with the gear 56, the gear 59 located upon the inner end of a shaft 60 mounted in bearings beneath the frame A, being provided at its outer end with a sprocket wheel 61 connected by a belt 62 with a pulley 63 on a shaft 64 mounted on the platform 65 of the binder, and driven therefrom in any suitable manner.

Beams 66, of any desired material and suitably spaced, are carried from the main frame A, in the direction of the binder platform 65, as is shown in Fig. 3ª, and upon said beams adjacent to the bundle receiving disk C, opposing vertical shafts 67 and 68 are mounted to revolve. These vertical shafts are in two sets, and a platform 69 is laid between them on the beams 66. The shafts 67 and 68 are braced from their upper ends by rods 70 that are secured to the main frame A, as is shown in Fig. 3ª. The shafts 67 and 68 at each side of the platform 69, carry endless conveyer aprons 71, that convey the bundles delivered to the platform 69 to the tray C, where they are supported and lean against the cone C′, being held in position by the spurs 57. The bundles from the binder platform fall into an upright chute 72, that inclines in the direction of the platform 69, to which the bundles are directed, and a spring arm 73 at the top of the chute 72 extending some distance over the binder platform, serves to direct the butts of the bundles downward and hold them in upright position in their passage to the said platform 69.

At 73ª is a bundle which is thus being guided by the spring arm 73. This spring arm is curved and strikes the butt of the sheaf a little below the band and holding the butt until the same drops downward, thereby tending to set the sheaf in a perpendicular position, the momentum of the sheaf forcing it forward.

A longitudinal shaft 74 is mounted in suitable bearings 75 upon the beams 66 and, as is shown in Fig. 2, the shaft 74 carries bevel gears 76, that mesh with corresponding gears 77 on the conveyer shafts 67. The rearmost gear 77 meshes with a gear 79 upon a transverse shaft 78, as is shown in Figs. 2 and 3ª, the said shaft 78 having a second gear 79ª at its inner end. Motion is communicated to the shafts 67 and 78 by meshing a gear 80 with the said gear 79ª. The gear 80 is upon the forward end of a line shaft 81, journaled in suitable bearings 82 and 83 in the main frame A. At the inner end of the line shaft 81, a bevel gear 84 is secured, and meshes with a like gear 85 upon the axle B′, as is shown in Fig. 3.

As has been stated, the connecting shaft 26 is normally out of operative engagement with the axle B′, but when the tray C has been properly loaded, the said axle and the said shaft are automatically coupled together by means of a pin 86 in the bottom of the tray, which engages the forward free end of the shifting lever 19, causing it to slide the box 20 inward and thus bring the gears 17 and 28 into engagement, thus setting the carriage D and parts carried thereby in motion. As the carriage D is nearing its normal position on its return trip after setting the shock on the ground, a hinged trip-arm 87, connected with the carriage D and provided with a foot 88, engages the inner end of the shifting lever 19 and lifts it from the notch or recess 23 in the bracket 24. By this operation, the spring 25 which, up to this time is held under tension, is released and said spring restores the lever to its normal position and the axle B′ and shaft 14 are thus disconnected. According to Fig. 8, the carriage D is traveling toward the left, and the trip arm is about to drag over the top of the lever 19. When, however, the carriage afterward moves to the right, the foot 88 will raise the lever 19.

In connection with the carriage D, I employ a conveyer guide arm F, having a channel or groove in its upper face, which arm, at its rear end, is pivoted by means of a pin 90 in bearings 89 secured to the front upper bar $d$ of the carriage D, as is shown in Fig. 4. A conveyer shifting arm F′ is mounted to slide in the conveyer guide arm F and the arm F′ is provided with a rack 91, in the upper face of its inner end and preferably at the left of the conveyer shifting arm F′, a conveyer trip arm F² is located, as is best shown in Figs. 1 and 4. The rear end of this arm F² slides upon the pivot 90, and in the upper face of its inner or rear end, is provided with a rack surface 92 corresponding to that of the guide arm F′.

Pinions 93, 94 respectively, engage the racks 91, 92, as will be understood from Fig. 4. The pinion 94 is mounted upon a shaft 95, the latter carrying a bevel pinion 96. The pinion 93 is mounted upon one end of a shaft 95ª, the opposite end of this shaft carrying a bevel pinion 96ª. The shafts 95, 95ª are supported in bearings, the latter being carried by the upper front portion $d$ of the carriage D.

The shifting arm F′ extends forwardly beyond the guide arm F, and at its outer end is provided with a lug 98 upon which an elbow lever 99 is fulcrumed, and the outer end of the trip arm or rod F² is pivoted to the upwardly-extending member of said lever. Triangularly-arranged braces 100 and 101 are secured to and extend down from the shifting arm F′ at its outer end and said shifting arm F′, at its outer end, carries a shock conveyer G, or device for lifting and transporting the shock. The lower portion of this device consists of opposing jaws $g$ and $g'$ pivoted to an upper structure consisting of opposing angular members 102 having lugs 103 adjacent to their lower ends, and the two said members 102 are jointly pivoted to the braces 100 and 101, as is shown at 104 in Figs. 1 and 6. The upper ends of the members 102 of the conveyer G, have a toggle connection with the elbow lever 99, brought about by links 105 pivoted to said members, and a single link 106 that pivotally connects the links 105 with the horizontal member of the lever 99, as is shown at 106ª and 106ᵇ. The jaws $g$ and $g'$ are provided at their free ends with segmental gripping members 107, adapted to receive between them a shock. The pivoted connection between the jaws $g$ and $g'$, and the upper section 102 of the conveyer G is designated as 108.

Each jaw $g$ and $g'$ is provided with a lug 109 adjacent to its pivot, and springs 110 engage the jaws, normally maintaining them in open position, as is shown in Fig. 1. When the shock conveyer G is in position to grasp a shock, its downward movement is limited by the guide arm F engaging the rest 9, a recess 111 being provided in said arm to steady it when thus resting.

At the inner end of the guide arm F, a roller 112 is mounted. This roller is adapted for engagement with the periphery of the main cam E, as is shown in Fig. 1. When this roller is engaged by the plain peripheral surface of the cam E, the guide arm F and connected parts will be elevated, but when the roller engages the recessed portion 34 of the cam, the said arm will drop, so as to bring the conveyer G over the shock upon the revolving platform or disk C, or to convey the shock to the ground, the arm F² acting first as a clamping medium and then as a discharging medium.

The gripping and releasing action of the shock conveyer is brought about as follows: Shafts 113 are journaled in any approved manner at each side of the upper forward portions of the carriage D, having beveled pinions 114 at their upper ends and corresponding pinions 115 at their lower ends. The shafts 95, 95ª are intermittently driven through the medium of the shafts 113 by the shaft 44 heretofore mentioned. To this end, a wheel H is secured at each end of the shaft 44. One of these wheels is shown in detail in Fig. 7. Each of said wheels is provided with toothed segments facing in opposite directions and designated at the left hand side of the device, or that side at which the trip arm F² is located, as 116 and 117, while corresponding toothed segments at the opposite side of the machine are designated as 116ª and 117ª. The left hand gear wheel, however, is provided with an intermediate toothed segment 118, facing in the same direction as the segment 116. The segments 116, 116ª, 117, 117ª, are for the purpose of giving a sliding movement to the arms F′ and F², while the segment 118 serves to give additional movement to the arm F². That is to say, the vertical shaft 113 (Figs. 4 and 6) is first given a rotary movement in one direction, in order to cause the grippers to seize the shock, and is a moment afterward given a rotary movement in the opposite direction, to release the shock, the time elapsing between these two rotary movements being the period consumed by the machine in shifting the shock to the ground. The toggle action of the links 105 causes the grippers, when once closed upon the shock to hold tightly upon the same, even when the grippers are momentarily released from control of the shaft 113.

It will be observed from Fig. 4 that the pinion 93 is on the section $x$ of the shaft 95 and the pinion 94 is upon the section x', thus permitting one pinion to act independently of the other, although at times both act in concert. A suitable pole 119 is employed to connect the shocker with the binding platform of a reaper and mower.

When the formation of the shock is complete and the arms F' and F² are lowered to receive the same, the short segment 118 at the left hand side of the machine engages the pinion 115 at the same side, which action retracts the arm F² and locks the jaws g and g' around the shock. The guide arm F is then raised by the cam E, and the carriage D is swung around from the position shown in Fig. 1 to the position shown in Fig. 6, so that the shock is deposited upon the ground. When this is done the segments 117 and 117ª extend the arms F' and F² far enough to increase the distance between the machine and the shock, due to the forward travel of the machine upon the ground while the conveyer fingers are rising from the shock. As the carriage D is returned to its normal position, the segments 116 and 117 draw the arms back to their normal positions ready for the next shock. It will be understood that the shock jaws g and g' are released from the shock by the same factors that caused them to grip.

The general operation may be summarized as follows:—Starting from the position indicated in Fig. 1, the arm F is lowered, the arm F² is then moved inwardly to grip the shock, the arm F is next raised, the carriage is rotated, the arm F is again lowered, both the arms F' and F² are moved outwardly at the same time, the arm F² is moved still farther outward to release the shock, the arm F is again raised, the carriage is rotated in the reverse direction, and the arms F' and F² are moved inwardly together. This cycle of steps is repeated over and over as the machine is drawn forward upon the ground. The manner in which this is accomplished will now be stated. As the machine travels forward, the rotation of the ground wheel B causes the shaft B' to turn in a clockwise direction according to Fig. 1. This causes rotation of the pinions 17, 28 and the shaft 26. The shifting lever 19 is used to throw the gearing into and out of action, which it does by moving the shaft 26 in a lateral direction, crossing the general path of travel of the machine (see Figs. 3 and 10). The pinion 16 while in action, turns in a clockwise direction, according to Fig. 1. Motion is communicated through the pinion 15 and shaft 42 and thence through the various gears shown in the lower left hand portion of Fig. 1, ultimately causing the shaft 44 to turn in a clockwise direction according to this figure. The sectors carried by the shaft 44 (see Fig. 7) by acting upon the pinion 115, cause the shaft 113 to rock first in one direction and then in the opposite direction. Motion being communicated through the pinions 114, 96 to the horizontal shaft 95, movements of this shaft cause the arm F² to be thrust forward and afterward drawn backward. Motion being transmitted through the sprocket chain 46 to the sprocket wheel 47, the cam E is turned in a clockwise direction according to Fig. 1. The rotation of the cam E causes the tripping of the arm F. In the positions indicated in Fig. 1, the arm F is just ready to drop in order to grasp a bundle of sheaves carried by the machine. A further rotation of the cam E will raise the arm F and the bundle with it. The rotary carriage is next turned a quarter of a revolution, so that the arm F, having raised the bundle, transfers the latter around to a right angle. The outer or free end of the arm being again raised (due to action of the cam E) the bundle is released and the arm is ready to be turned back into its original position, as indicated in Fig. 1. The rotation of the carriage is caused by the sectors e acting alternately upon the pinion 48 (lower left-hand corner of Fig. 1) which transmits power through the shaft 49, pinions 50, 51 and 53, to the rack 13. This movement of the carriage takes place in proper sequence relatively to the lifting and lowering of the bundle. After the bundle is deposited upon the ground and before the gripping fingers are completely released from it, the machine being in motion, of course, travels forward a little distance before the bundle is completely released. The segmental racks e and e' and the gear pinions 48, 50, 51, and 53 are so proportioned that the engagement of either segmental rack with the pinion 48 corresponds to a degree of rotation of the frame D of a little more than 90 degrees, this being the relative movement of the frame D and of the segmental racks, being simply a matter of gearing. It is desirable that the frame D shall be free to turn a little more than 90 degrees, although in practice this angular distance is sufficient. The carriage D is rotated by the rack e' while the arms F' and F² are being extended. The length of the rack 117 is equal to that of the sum of the racks 117 and 118. Similarly the rack 117ª is equal in length to the rack 116ª. This arrangement is desirable in order that the racks 117, 117ª may be able to restore the arms F' and F² to the respective positions they occupied before they were extended.

The springs employed in connection with the conveyer fingers serve to make the tension on said fingers about equal for both large and small shocks.

The gears 113, 116, 117 are merely for the purpose of causing the gripping and releasing of the shocks. The raising and lowering of the shocks by aid of the arms F, F' and F² are controllable by the cam E qualified by the motion of the carriage D.

Having thus described my invention, I claim as new and desire to secure by Letters Patent:

1. The combination of a binding platform, a revoluble bundle receiver, means for conducting bundles from the platform to the receiver, a stacker supported by the receiver and bundle-retaining devices carried by the stacker.

2. The combination of a binding platform, a revoluble bundle receiver, directing mediums associated with the said platform and receiver, a shock forming element supported by the receiver, and movable retaining devices carried by the shock-forming element.

3. The combination of a revoluble bundle receiver, a shock-forming element constituting a portion thereof, releasable retaining devices for the bundles carried by the said element, a shock conveyer movable to and from the shock-forming element, means for opening and closing the conveyer, means for raising and lowering the conveyer, means for moving the conveyer laterally, and devices operated by the movement of the machine for timedly operating said means.

4. In a shocker, the combination of a revolving carriage, a guide arm pivoted thereon, a shifting arm slidable in the guide arm, a shock conveyer having members movable to and from each other, and a trip arm adapted to open and close the said conveyer.

5. In a shocker, the combination of a revolving carriage, a guide arm pivoted thereon, means for raising and lowering the guide arm, a shifting arm slidably mounted in the guide arm, a shock conveyer constructed with pivotally-connected jaws, a slidable trip arm, means connecting the trip arm and conveyer for opening and closing the latter, means for rotating the carriage, and means for imparting end movement to the said arms.

6. In a shocker, the combination of a revoluble carriage, a guide arm pivoted thereon, devices for raising and lowering the same, a shifting arm slidable in the guide arm, a shock conveyer having jaws movable to and from each other, a trip arm slidable upon the carriage, a toggle connection between the conveyer and trip arm, and means for imparting end movement to said arms.

7. In a shocker, the combination of a revoluble carriage, a guide arm pivoted thereon, and devices for raising and lowering the same, a shifting arm slidable in the guide arm, a shock conveyer having jaws movable to and from each other, a trip arm slidable upon the carriage, a toggle connection between the jaws and trip arm, means for imparting concerted end movement to the arms, and means for imparting timed and independent movement to the trip arm.

8. In a shocker, the combination of a revolving carriage, means for rotating the same by the movement of the machine, a cam operated by such movement, and a guide arm pivoted upon the carriage and having bearing against said cam, a shifting arm slidably mounted in the guide arm, a gripping shock-conveyer supported from the shifting arm, a slidable trip arm mounted upon the carriage, lever and toggle connections between the conveyer and the trip arm, and devices for imparting end movement to said arms and independent end movement to the trip arm, at a predetermined time in the operation of the machine.

9. In a shocker, the combination of a revolving carriage, means for rotating the same, a cam upon the carriage, operating connections between the operating devices for the carriage and said cam, a guide arm pivoted upon said carriage, having roller bearing relative to the cam, and a shifting arm movable in the guide arm, a shock conveyer supported from the said shifting arm, comprising spring-controlled opposing jaws, a trip arm movable in the same direction as the shifting arm, a lever and toggle connection between the conveyer and shifting arm, a controlling shaft and drive shafts for the said arms, and rack and pinion connections between the said arms and the said drive shafts.

10. The combination of a vehicle provided with a wheel for engaging the ground, gearing connected with said wheel and operable by rotation of the latter, a revoluble platform carried by said vehicle, a revoluble bundle receiver mounted upon said vehicle, and a conveyer supported upon said platform and revoluble therewith for the purpose of conveying the shocks from said bundle receiver to the ground.

11. The combination of a vehicle provided with a wheel for engaging the ground, said wheel serving as a driving wheel, gearing connected with said wheel and driven thereby, movable arms carried by said vehicle, connections from said arms to said gearing for causing said arms to be extended and withdrawn, and gripping mechanism connected with one of said arms and controllable by movements thereof for grasping bundles of grain.

12. The combination of a vehicle provided with a wheel for engaging the ground and driven by movements of said vehicle relatively to the ground, gearing connected with said wheel and driven thereby, a frame journaled upon said vehicle and adapted to turn, arms extending from said frame and adapted to turn therewith, gripping devices carried by one of said arms, connections from said gearing to said frame for the purpose of turning said frame and said arms.

In testimony whereof I have signed my name to this specification in the presence of two subscribing witnesses.

PEARL WILSON SHARP.

Witnesses:
J. E. MURPHY,
D. E. McLELLAN.

Copies of this patent may be obtained for five cents each, by addressing the "Commissioner of Patents, Washington, D. C."